US012565964B2

(12) United States Patent
Lee

(10) Patent No.: US 12,565,964 B2
(45) Date of Patent: Mar. 3, 2026

(54) FIXING STRUCTURE

(71) Applicant: ASROCK INDUSTRIAL COMPUTER CORPORATION, Taipei (TW)

(72) Inventor: Ming-Jei Lee, Taipei (TW)

(73) Assignee: ASROCK INDUSTRIAL COMPUTER CORPORATION, Taipei (TW)

( * ) Notice: Subject to any disclaimer, the term of this patent is extended or adjusted under 35 U.S.C. 154(b) by 44 days.

(21) Appl. No.: 18/649,434

(22) Filed: Apr. 29, 2024

(65) Prior Publication Data

US 2024/0392915 A1     Nov. 28, 2024

(30) Foreign Application Priority Data

May 23, 2023    (TW) .................................. 112205129

(51) Int. Cl.
*G06F 1/18* (2006.01)
*F16M 13/02* (2006.01)
*G06F 1/183* (2026.01)

(52) U.S. Cl.
CPC ............. *F16M 13/02* (2013.01); *G06F 1/183* (2013.01)

(58) Field of Classification Search
CPC ........... G06F 1/183; H05K 7/12; F16M 13/02
See application file for complete search history.

(56) References Cited

U.S. PATENT DOCUMENTS

| | | | | |
|---|---|---|---|---|
| 7,507,101 B2 * | 3/2009 | Chiang | ................ | H05K 7/1061 |
| | | | | 439/71 |
| 9,949,396 B2 * | 4/2018 | Zhang | ..................... | G06F 1/183 |
| 11,449,111 B2 * | 9/2022 | Buddrius | ............ | H01L 23/4006 |
| 11,800,666 B2 * | 10/2023 | Singer | ..................... | H05K 5/03 |
| 2014/0199860 A1 | 7/2014 | Liang et al. | | |
| 2021/0176871 A1 * | 6/2021 | Ren | ........................... | A47G 1/14 |
| 2025/0081362 A1 * | 3/2025 | Lin | ........................ | H05K 5/006 |

FOREIGN PATENT DOCUMENTS

| | | |
|---|---|---|
| CN | 103943993 A | 7/2014 |
| CN | 218004097 U | 12/2022 |

* cited by examiner

*Primary Examiner* — Bradley Duckworth
(74) *Attorney, Agent, or Firm* — MUNCY, GEISSLER, OLDS & LOWE, P.C.

(57) ABSTRACT

A fixing structure is configured to detachably fix a processor on a substrate and includes: a base, an outer frame, and an inner frame. The base includes an accommodating portion configured to mount the processor. The outer frame surrounds the base and a frame space is defined between the accommodating portion and the outer frame, where each of two opposite sides of the outer frame separately includes an engagement groove. The inner frame is embedded in the frame space, the inner frame includes two elastic buckling elements, and the two elastic buckling elements are respectively engaged with the engagement grooves. The two elastic buckling elements are adapted to be moved toward the processor through elastic deformation, so that the two elastic buckling elements are capable of jointly clamping the processor to detach from the accommodating portion.

8 Claims, 7 Drawing Sheets

FIXING STRUCTURE

CROSS-REFERENCE TO RELATED APPLICATION

This application claims the priority benefit of Taiwan application serial no. 112205129, filed on May 23, 2023. The entirety of the above-mentioned patent application is hereby incorporated by reference herein and made a part of this specification.

TECHNICAL FIELD

The present disclosure relates to a fixing structure, and in particular, to a detachable fixing structure.

BACKGROUND

Generally, a central processing unit (CPU) is mostly fixed to a main board of a computer by using a buckle, to prevent the CPU from detaching from the main board when the computer is moved and causing damage to the computer. A current processor buckle (wire buckle type) produces a pounding force on a processor. When the processor is buckled and positioned, a downward pressure is applied in a process of fastening the buckle to cause a substrate to be closely attached to the processor. Plate bending is formed on the processor due to a fixing manner (uneven force application) of local force application and the pounding force generated during locking. Further, when a radiator is subsequently locked on the processor, the radiator needs to be buckled and fixed through locking elements at four corners around the radiator. Locking points of the locking elements at the four corners are farther away and a hinge of the radiator is longer, resulting in a more obvious plate bending effect. The processor may have a gap due to the plate bending effect. In addition, improper force application (uneven force application) in a locking process may also cause damage to the processor or the substrate carrying the processor.

Further, an existing disassembly process of the processor is to disassemble the locking elements (such as screws) locked at the four corners of the substrate, thereby loosening the processor from the substrate. However, the process of disassembling the screws is cumbersome, and the screws are small in size. A little carelessness may further cause the screws to fall or be lost, which increases difficulty of assembly and disassembly and reduces efficiency of assembly and disassembly.

SUMMARY

The present disclosure provides a detachable fixing structure. The fixing structure resolves a plate bending problem caused by the design of local force application of a processor and replaces a manner of mounting and fixing a processor by using a locking element (such as a screw).

A fixing structure of the present invention is configured to detachably fix a processor on a substrate and includes a base, an outer frame and an inner frame. The base includes an accommodating portion configured to mount the processor. The outer frame surrounds the base.

A frame space is defined between the accommodating portion and the outer frame. Each of two opposite sides of the outer frame includes an engagement groove. The inner frame is embedded in the frame space. The inner frame includes two elastic buckling elements, and the two elastic buckling elements are respectively engaged with the engagement grooves. The two elastic buckling elements are adapted to be moved toward the processor through elastic deformation, so that the two elastic buckling elements are capable of jointly clamping the processor to detach from the accommodating portion.

Based on the above, an objective of the present disclosure is to provide a fixing structure. The fixing structure may position and assemble the processor through the outer and inner frames to resolve the problem of plate bending formed on the processor before the radiator is mounted. The inner frame and the processor are removed synchronously by the elastic buckling elements, which effectively improves the current design of fixing and disassembling the processor in a manner of locking by using screws, and thereby having excellent usability, facilitating assembly and disassembly, reducing derivative costs, and achieving excellent economic benefits of assembly and use.

To make the features and advantages of the present disclosure clear and easy to understand, the following gives a detailed description of embodiments with reference to accompanying drawings.

DETAILED DESCRIPTION

Figure 1:
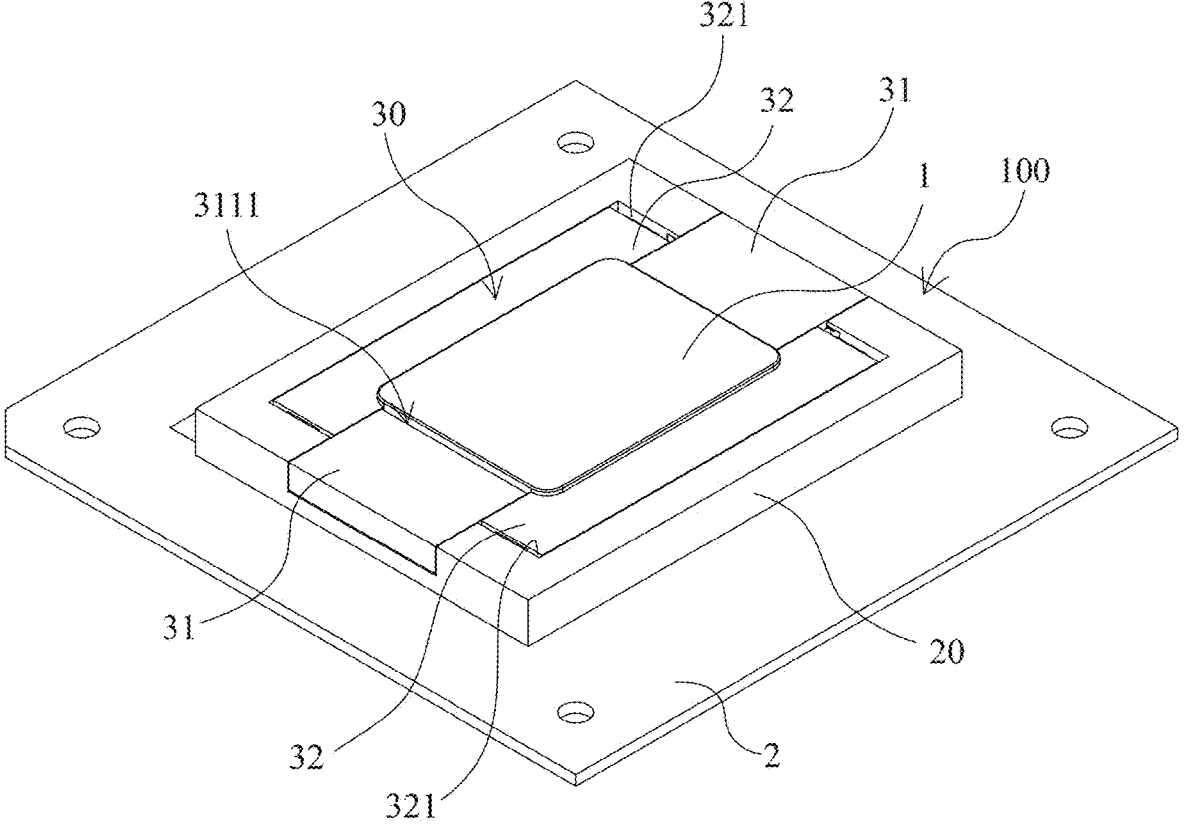
FIG. 1 is an assembled schematic diagram of a fixing structure assembled on a substrate according to an embodiment of the present disclosure.
Figure 2:
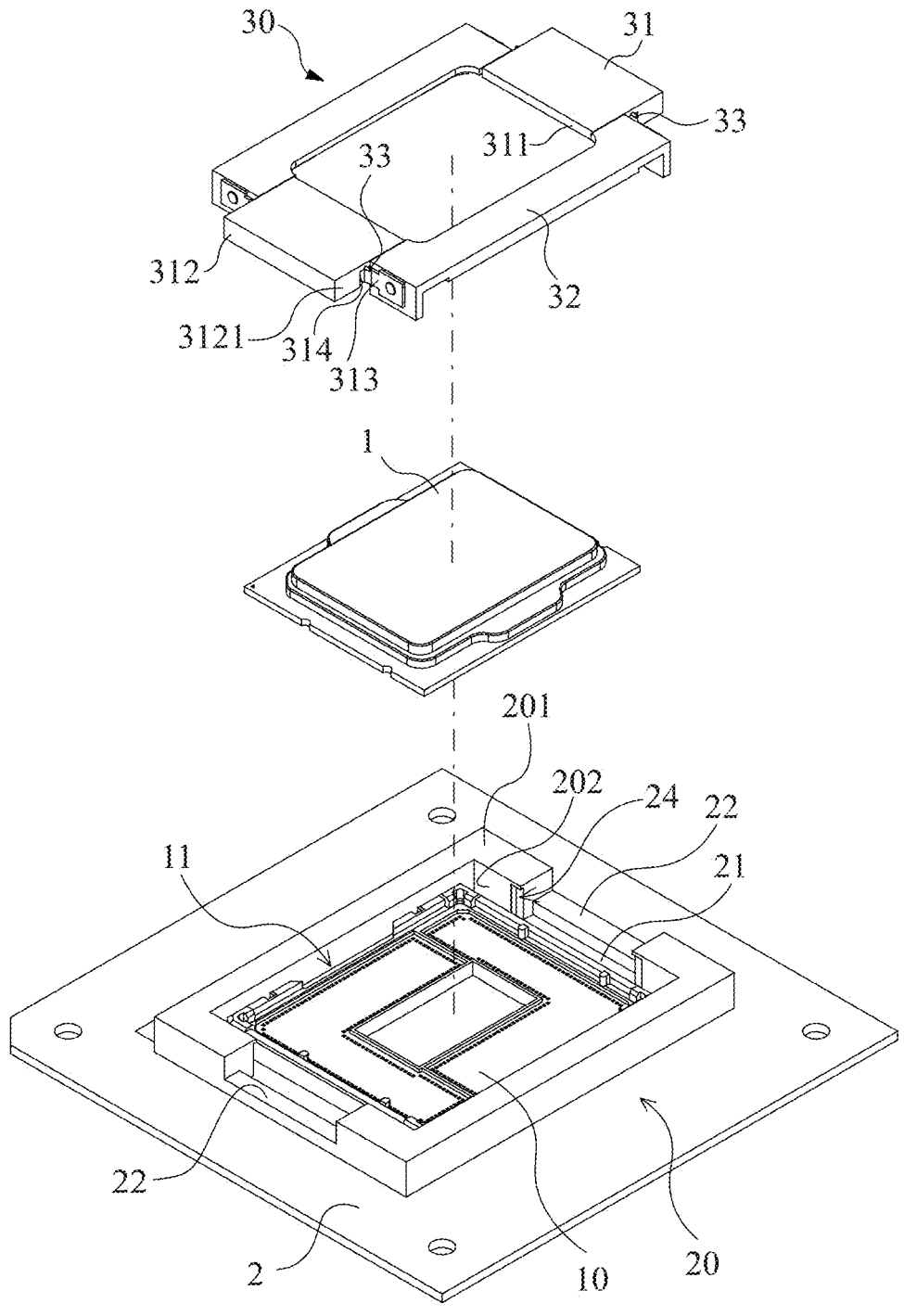
FIG. 2 is an exploded schematic diagram of a fixing structure assembled on a substrate according to an embodiment of the present disclosure.
Figure 3:
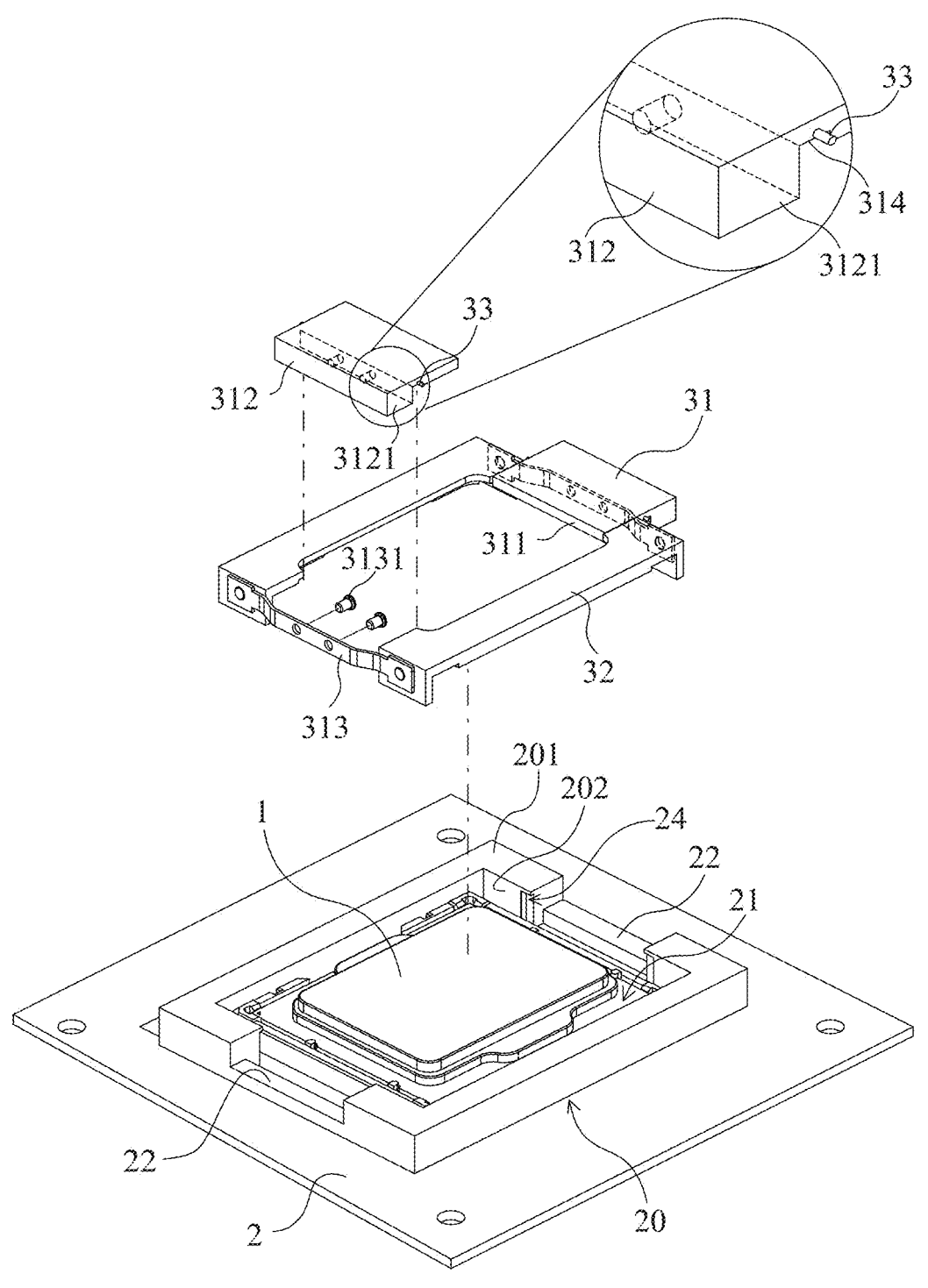
FIG. 3 is a partially exploded schematic diagram of an inner frame of a fixing structure embedded in a frame space according to an embodiment of the present disclosure.
Figure 4:
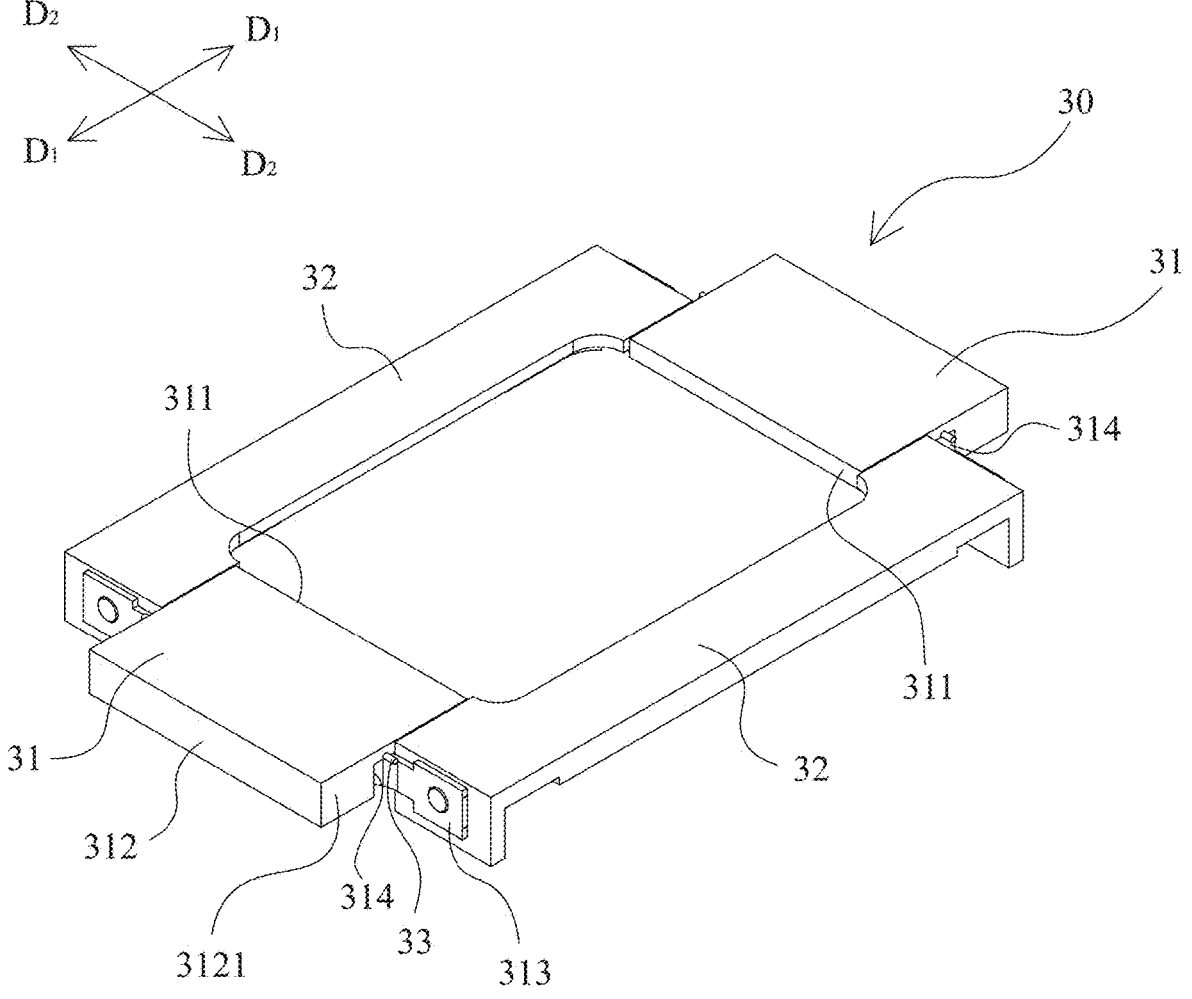
FIG. 4 is a schematic diagram of an inner frame of a fixing structure according to an embodiment of the present disclosure.
Figure 5:
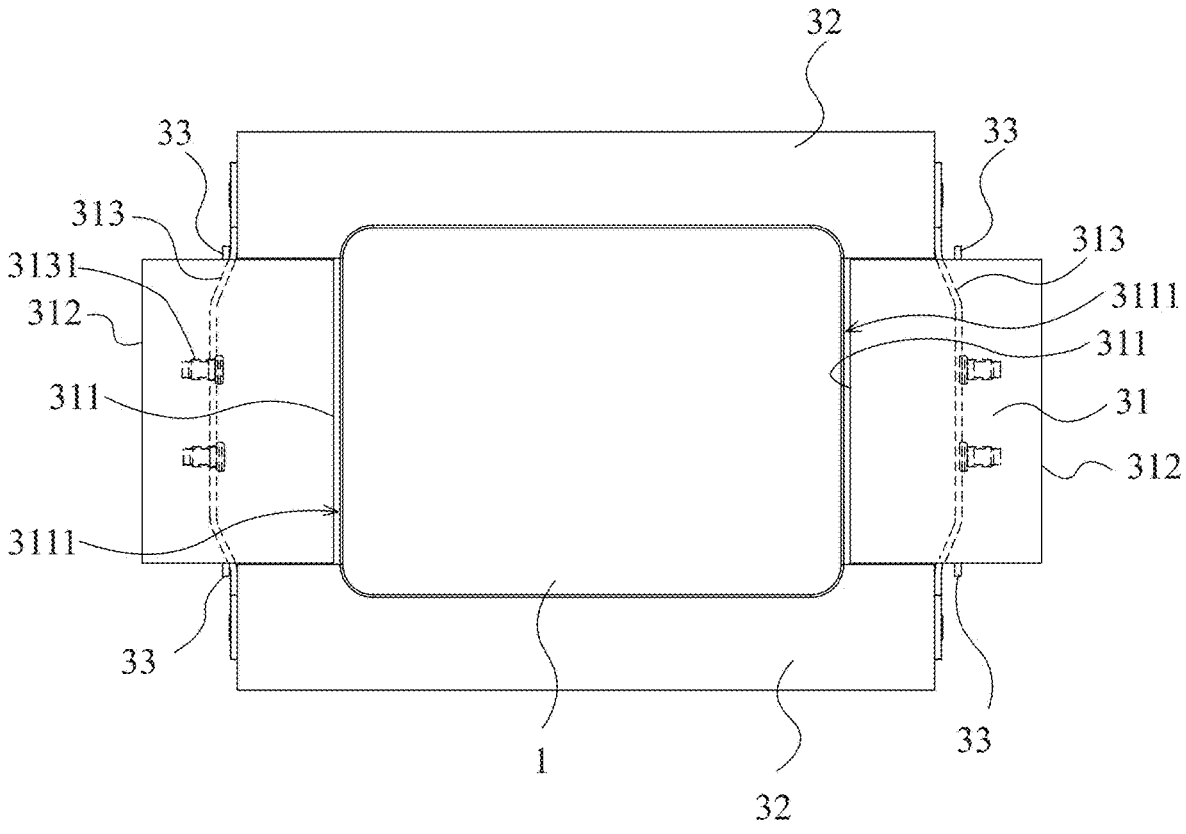
FIG. 5 is a schematic top view of the inner frame in FIG. 4.

FIG. 1 is an assembled schematic diagram of a fixing structure assembled on a substrate according to an embodiment of the present disclosure. FIG. 2 is an exploded schematic diagram of a fixing structure assembled on a substrate according to an embodiment of the present disclosure. FIG. 3 is a partially exploded schematic diagram of an inner frame of a fixing structure embedded in a frame space according to an embodiment of the present disclosure. FIG. 4 is a schematic diagram of an inner frame of a fixing structure according to an embodiment of the present disclosure. FIG. 5 is a schematic top view of the inner frame in FIG. 4.

Referring to FIG. 1 to FIG. 5, a fixing structure 100 of the present disclosure is configured to detachably fix a processor 1 on a substrate 2, and the fixing structure 100 includes a base 10, an outer frame 20, and an inner frame 30. The base 10 is arranged on the substrate 2, the base 10 includes an accommodating portion 11, and the accommodating portion 11 is configured to mount the processor 1. The outer frame 20 surrounds the base 10, and a frame space 21 is defined corresponding to the accommodating portion 11. In more detail, the frame space 21 forms a space between the accommodating portion 11 of the base 10 and the outer frame 20. The outer frame 20 may be of a square frame body structure including two long sides and two short sides. Two opposite sides of the outer frame 20 include engagement grooves 22, respectively. In this embodiment, the two engagement grooves 22 are respectively provided on the two short sides. In more detail, the outer frame includes a first surface 201 (an upper side surface) and a second surface 202 (an inner side surface). The first surface 201 is connected to and perpendicular to the second surface 202. The engagement grooves 22 are located on the short sides and concavely extend from the first surface 201 to the second surface 202 to form a groove for the inner frame body 30 to be engaged with.

The inner frame 30 is embedded in the frame space 21 between the accommodating portion 11 and the outer frame 20. In other words, the inner frame 30 is embedded corresponding to a space in the second surface 202 of the outer frame 20. The inner frame 30 includes two elastic buckling elements 31 and two positioning frame bars 32. The two positioning frame bars 32 are respectively connected to the two elastic buckling elements 31, and the two positioning frame bars 32 and parts of the two elastic buckling elements 31 are located in the frame space 21. The two elastic buckling elements 31 are respectively engaged with the two engagement grooves 22, and the processor 1 is positioned in the accommodating portion 11 by the inner frame 30. The two elastic buckling elements 31 are adapted to be moved toward the processor 1 in a first axial direction D1 (referring to FIG. 4) through elastic deformation, so that the two elastic buckling elements 31 jointly clamp the processor 1 to detach the processor 1 from the accommodating portion 11.

As shown in FIG. 4 and FIG. 5, the two positioning frame bars 32 of the inner frame 30 are respectively connected to the two elastic buckling elements 31, so that the inner frame 30 is of a square frame body structure to be correspondingly embedded in the outer frame 20. The frame space 21 is configured to accommodate the two positioning frame bars 32 and the two elastic buckling elements 31. The processor 1 is engaged and positioned in the accommodating portion 11 by the inner frame 30 embedded in the frame space 21.

Figure 6:
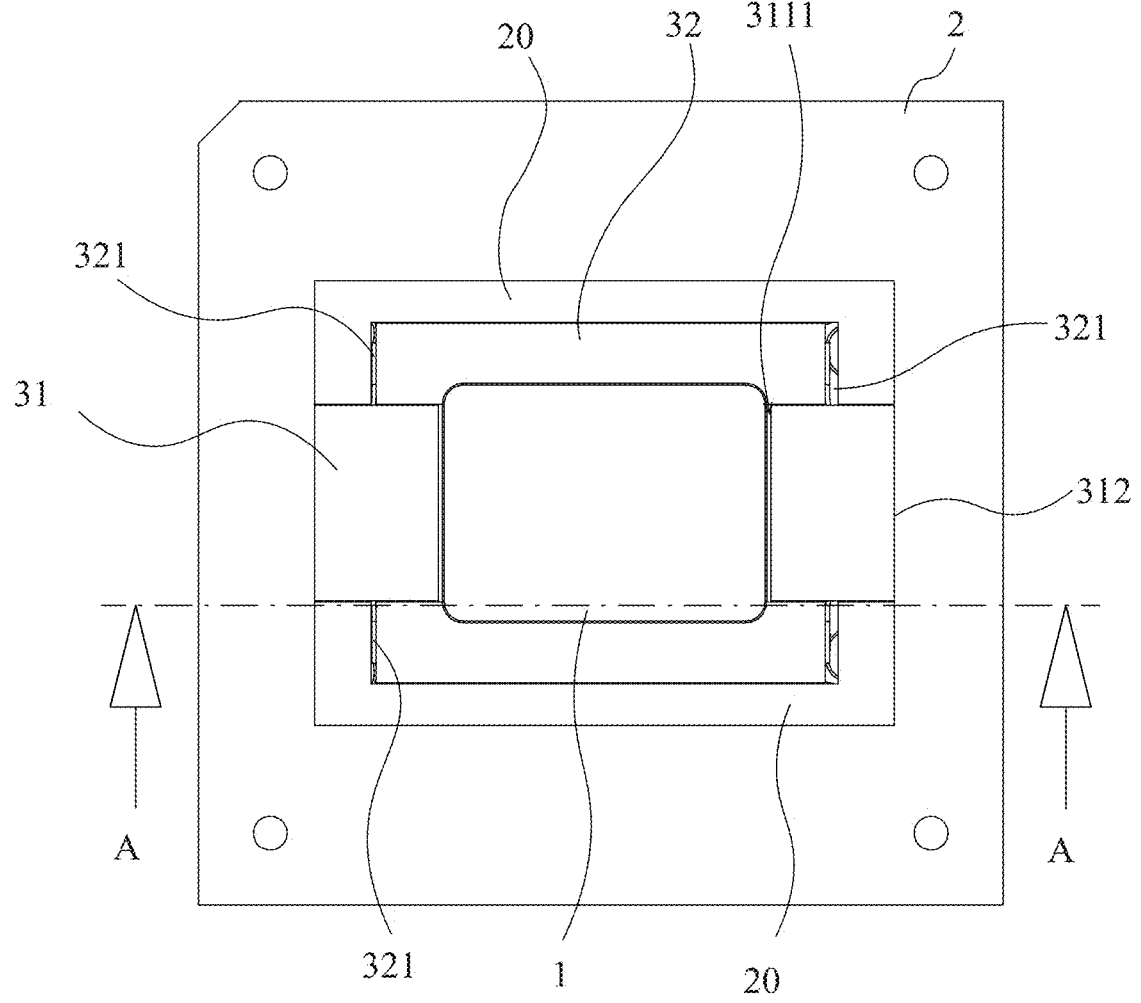
FIG. 6 is a schematic top view of the fixing structure assembled on the substrate in FIG. 1.

FIG. 6 is a schematic top view of the fixing structure assembled on the substrate in FIG. 2. One end of each elastic buckling element 31 includes a pressing end 311, and the other end of each elastic buckling element 31 includes a force-bearing end 312 for pressing. The force-bearing ends 312 are correspondingly arranged in the engagement grooves 22, and the pressing ends 311 movably abut against the processor 1. Further, each of the force-bearing ends 312 includes a convex block 3121 corresponding to the respective engagement groove 22, and the inner frame 30 is embedded in the frame space 21 by embedding the convex blocks 3121 in the engagement grooves 22. In addition, each elastic buckling element 31 further includes an elastic element 313 and a sliding groove 314. The elastic elements 313 are partially located in the sliding grooves 314, respectively. Each elastic element 313 and each sliding groove 314 are located between the force-bearing end 312 and the pressing end 311 of each elastic buckling element 31. Each elastic element 313 and each sliding groove 314 are correspondingly provided on a surface (a lower surface) of each elastic buckling element 31 facing the base 10. The elastic elements 313 and the sliding grooves 314 are provided in a direction extending along a second axial direction D2 perpendicular to the first axial direction D1. Each of two side surfaces of each elastic buckling element 31 separately includes a convex pillar 33 extending outward. Each of two inner surfaces of the outer frame 20 corresponding to the engagement groove 22 separately includes a limiting groove 24 for accommodating the convex pillar 33. There is a gap 321 between each of the two end portions of the positioning frame bar 32 corresponding to the two elastic buckling elements 31 and the outer frame 20 respectively. The gap 321 extends in the second axial direction D2 perpendicular to the first axial direction D1, and the limiting groove 24 is in communication with the gap 321. When the force-bearing end 312 is pressed by a user, the convex pillar 33 is displaced from the limiting groove 24 to the gap 321 in the first axial direction D1. Further, a specific structure of the elastic element 313 and the convex pillar 33 that are included in the inner frame 30 may be learnt in FIG. 3. The two end portions of each elastic element 313 are separately fixed on the positioning frame bars 32. A middle portion of each elastic element 313 is locked on an inner wall of the convex block 3121 through, for example, screws 3131, so that the elastic buckling element 31 is connected to the positioning frame bar 32 through the elastic element 313 and is displaced relative to the positioning frame bar 32 through elastic deformation of the elastic element 313. When the inner frame 30 is embedded with the outer frame 20, the elastic element 313 is compressed and deformed, and the convex pillar 33 is engaged into the limiting groove 24. In this way, the inner frame 30 and the outer frame 20 jointly lock the processor 1 in the accommodating portion 11.

In this embodiment, each elastic element 313 is of an elastic sheet-shaped structure, such as an elastic piece, but is not limited thereto. Each elastic element 313 extends to the corresponding gap 321 in the second axial direction D2 and is attached to the positioning frame bars 32. The two end portions of each elastic element 313 are separately attached to the positioning frame bar 32 corresponding to the second surface 202 of the outer frame 20, as shown FIG. 2 and FIG. 3. Therefore, gaps 321 are provided at the second surface 202 of two end portions of the positioning frame bar 32 corresponding to the outer frame 20 to accommodate the elastic elements 313.

In short, the force-bearing ends 312 are pressed, and the pressing ends 311 are pushed to abut against the processor 1. The convex pillars 33 are pushed out of the limiting grooves 24, and the two ends of the processor 1 are abutted against and clamped by the pressing ends 311. In this way, the processor 1 is detached from the accommodating portion 11, which is described in more detail in the following description.

In the following embodiments, a state of the processor assembled on the substrate and a process of disassembling the processor are described. Referring to FIG. 6 and FIG. 1, the processor 1 is assembled and fixed on the substrate 2. In this embodiment, the substrate 2 may be a PCB board or a main board. First, the base 10 is locked on the substrate 2, then the outer frame 20 is mounted around the base 10, and then the processor 1 is mounted in the accommodating portion 11. The inner frame 30 is covered in the frame space 21 between the base 10 and the outer frame 20. In addition, by engaging the convex pillars 33 of the inner frame 30 into the limiting grooves 24 of the outer frame 20, a stable engagement between the inner frame 30 and the outer frame 20 is ensured. In this case, the force-bearing ends 312 are not subjected to a pressing force, the convex pillars 33 are limited in the limiting grooves 24, and the inner frame 30 is embedded in the outer frame 20. A reserved space 3111 (referring to FIG. 1 and FIG. 7A) is formed between the pressing end 311 and the processor 1, which represents that the processor 1 is not clamped by the pressing ends 311, so that the processor 1 is positioned in the accommodating portion 11, and the processor 1 is assembled on the substrate 2.

Figure 7A:
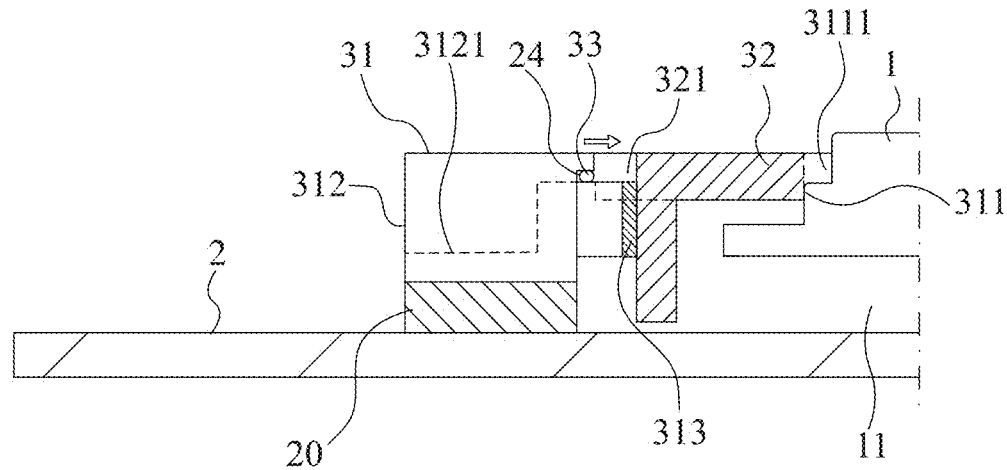
FIG. 7A is a schematic cross-sectional view that is taken along a section line A-A in FIG. 6, showing the fixing structure in an assembled state.
Figure 7B:
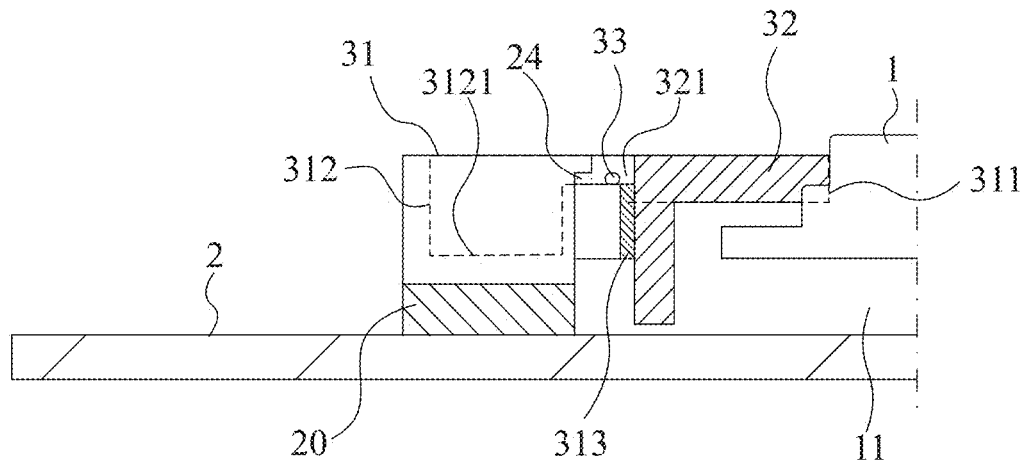
FIG. 7B is a schematic cross-sectional view that is taken along a section line A-A in FIG. 6, showing the fixing structure in a disassembled state.

FIG. 7A is a schematic cross-sectional view of a fixing structure in an assembled state according to an embodiment of the present disclosure, and FIG. 7B is a schematic cross-sectional view of a fixing structure in a disassembled state according to an embodiment of the present disclosure. When the processor 1 needs to be disassembled, the force-bearing ends 312 are pressed toward the processor 1 in the first axial direction D1 by a pressing force applied through a thumb and an index finger of a user. In other words, the thumb and the index finger of the user separately exert the pressing force toward a direction of the processor 1 on the force-bearing ends 312, and the two elastic buckling elements 31 are pressed and separately move relatively toward the processor 1 in the first axial direction D1, which in turn causes the convex pillars 33 to move out of the limiting grooves 24 in the first axial direction D1. In other words, the convex pillars 33 are moved from the limiting grooves 24 to the gaps 321 and will subsequently be taken out from the gaps 321. In addition, the elastic elements 313 are deformed by the pressing force and displaced in the sliding grooves 314, and then the two pressing ends 311 are pushed to separately abut against the processor 1 to jointly clamp the processor 1. In this case, a reserved space 3111 between the pressing end 311 and the processor 1 no longer exists, which represents that the two ends of the processor 1 are separately clamped by the pressing ends 311, so that when the inner frame 30 is disassembled, the processor 1 is also taken out from the accommodating portion 11 of the base 10.

In summary, the present disclosure provides a detachable fixing structure. The fixing structure resolves a plate bending problem caused by the design of local force application of a processor and replaces a manner of mounting and fixing a processor by using locking elements (such as screws). The processor structure of the present disclosure positions and assembles the processor by using the design of outer and inner frames that are embedded in each other, to resolve the problem of plate bending formed on the processor before the radiator is mounted. The inner frame and the processor are removed synchronously by using the elastic buckling elements. There is no need to lock the processor by using screws, and it is more effective to disassemble the processor in a manner of clamping the processor by using the two elastic buckling elements, which improves the current design of fixing and disassembling the processor in a manner of locking by using the screws.

Although the present disclosure is described with reference to the above embodiments, the embodiments are not intended to limit the present disclosure. A person of ordinary skill in the art may make variations and modifications without departing from the spirit and scope of the present disclosure. Therefore, the protection scope of the present disclosure should be subject to the appended claims.

What is claimed is:

1. A fixing structure, configured to detachably fix a processor on a substrate and comprising:
   a base, comprising an accommodating portion configured to mount the processor;

an outer frame, surrounding the base, wherein a frame space is defined between the accommodating portion and the outer frame, and two opposite sides of the outer frame comprise engagement grooves, respectively; and an inner frame, embedded in the frame space, wherein the inner frame comprises two elastic buckling elements, and the two elastic buckling elements are respectively engaged with the engagement grooves, and the two elastic buckling elements are adapted to be moved toward the processor through elastic deformation, so that the two elastic buckling elements are capable of jointly clamping the processor to detach from the accommodating portion, wherein the inner frame further comprises two positioning frame bars, the two positioning frame bars are respectively connected to the two elastic buckling elements, and the two positioning frame bars and parts of the two elastic buckling elements are located in the frame space, and wherein one end of each of the two elastic buckling elements comprises a pressing end, the other end of each of the two elastic buckling elements comprises a force-bearing end for pressing, the force-bearing end is correspondingly arranged in the engagement groove, and the pressing end is adapted to abut the processor.

2. The fixing structure according to claim 1, wherein each of the two elastic buckling elements further comprises an elastic element and a sliding groove, the elastic element and the sliding groove are located between the force-bearing end and the pressing end, and the elastic element is partially located in the sliding groove.

3. The fixing structure according to claim 2, wherein each of two side surfaces of each of the two elastic buckling elements separately comprises a convex pillar, and each of two inner side surfaces of the outer frame corresponding to the engagement groove separately comprises a limiting groove for accommodating the convex pillar, and when the convex pillar is positioned in the limiting groove, the processor is positioned in the accommodating portion; and when the force-bearing end is pressed to make the convex pillar move from the limiting groove, the elastic element is deformed and displaced in the sliding groove, and the pressing end abuts the processor so that the processor is detached from the accommodating portion.

4. The fixing structure according to claim 3, wherein a gap is between each of two ends of each of the two positioning frame bars corresponding to the two elastic buckling elements and the outer frame, the limiting groove is in communication with the gap, and when the force-bearing end is pressed, the convex pillar is moved from the limiting groove to the gap.

5. The fixing structure according to claim 4, wherein two ends of the elastic element are attached to the positioning frame bar and located at the gap.

6. The fixing structure according to claim 5, wherein the force-bearing end of each of the two elastic buckling elements comprises a convex block, and the convex block is embedded in the engagement groove.

7. The fixing structure according to claim 2, wherein the sliding groove is located at a surface of each of the two elastic buckling elements facing the base.

8. The fixing structure according to claim 2, wherein the elastic element is an elastic sheet-shaped structure.

\* \* \* \* \*